United States Patent [19]

Cucci et al.

[11] Patent Number: 5,672,832
[45] Date of Patent: Sep. 30, 1997

[54] CHEMICALLY INERT FLOW METER WITHIN CAUSTIC FLUIDS HAVING NON-CONTAMINATING BODY

[75] Inventors: Gerald R. Cucci; Diane L. Englund, both of Minneapolis, Minn.

[73] Assignee: NT International, Inc., Fridley, Minn.

[21] Appl. No.: 601,786

[22] Filed: Feb. 15, 1996

[51] Int. Cl.⁶ .................. G01L 7/00; G01F 1/44
[52] U.S. Cl. .................. 73/861.52; 73/861.47; 73/706
[58] Field of Search .................. 73/861.42, 861.47, 73/861.52, 861.63, 706, 756

[56] References Cited

U.S. PATENT DOCUMENTS

| | | | |
|---|---|---|---|
| 2,190,713 | 2/1940 | Hintze et al. | 73/115 |
| 2,734,526 | 2/1956 | Aagaard | 73/861.42 |
| 4,177,496 | 12/1979 | Bell et al. | 73/724 |
| 5,063,784 | 11/1991 | Ridenour | 73/756 |
| 5,183,078 | 2/1993 | Sorrell | 137/883 |
| 5,184,514 | 2/1993 | Cucci et al. | 73/706 |
| 5,207,102 | 5/1993 | Takahashi et al. | 73/706 |
| 5,313,839 | 5/1994 | Ridenour | 73/706 |
| 5,316,035 | 5/1994 | Collins et al. | 137/312 |
| 5,349,492 | 9/1994 | Kimura et al. | 73/724 |
| 5,410,916 | 5/1995 | Cook | 73/706 |

*Primary Examiner*—Richard Chilcot
*Assistant Examiner*—Harshad Patel
*Attorney, Agent, or Firm*—Haugen & Nikolai, PA

[57] ABSTRACT

A non-contaminating flow meter having an isolation member is disclosed. The flow meter includes two pressure sensor transducers, located on opposite sides of a restriction in a conduit. Each of pressure transducers is isolated by an isolation member from exposure to fluids flowing through the conduit. The flow meter may be positioned in-line within a fluid flow circuit carrying corrosive materials, wherein the square root of the difference in pressure between the two pressure sensors is calculated to thereby determine the rate of flow within the fluid flow conduit. The flow meter compensates for changes in temperature within the fluid flow circuit and further activates an alarm if the pressure or flow rate within the fluid flow conduit exceeds or falls below a threshold level. The flow meter of the present invention also avoids the introduction of particulate, unwanted ions, or vapors into the flow circuit.

29 Claims, 7 Drawing Sheets

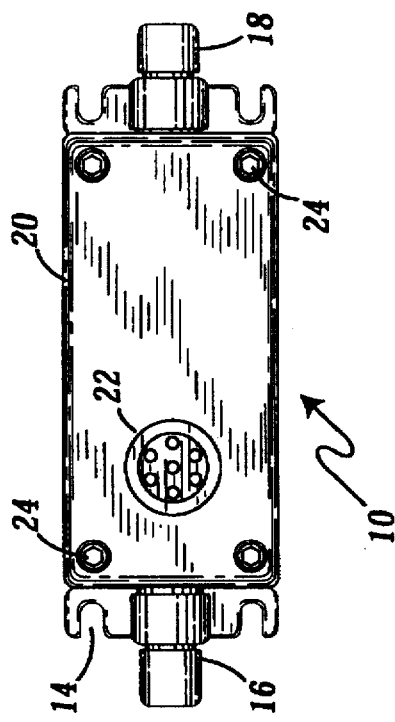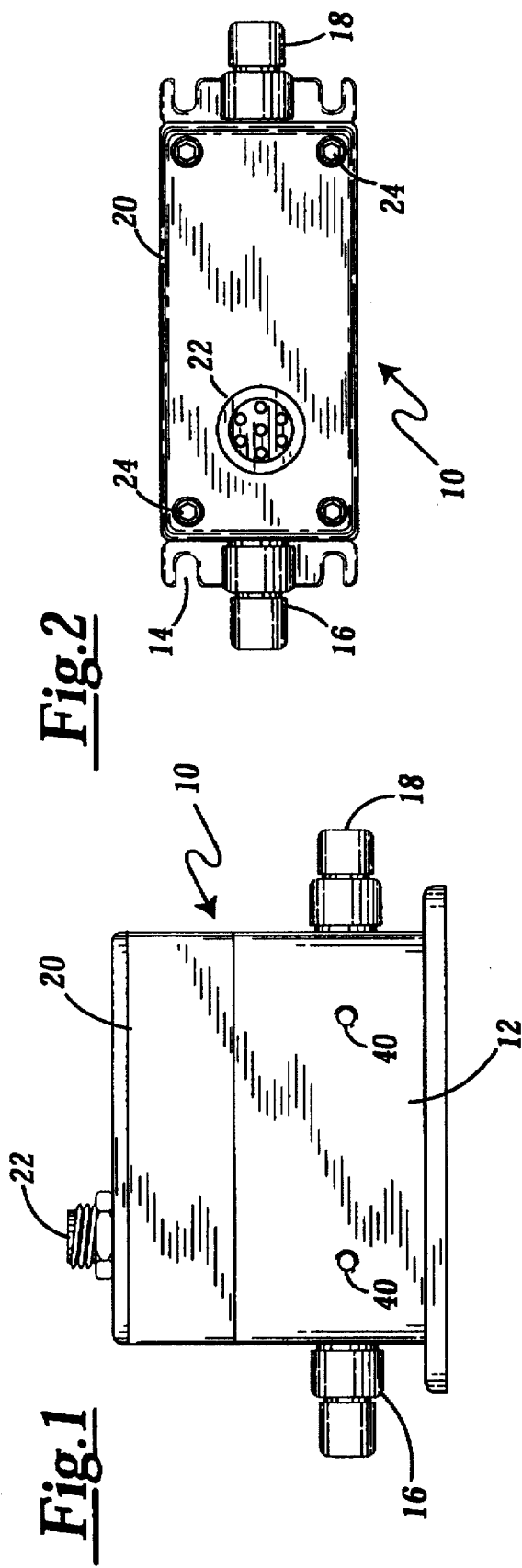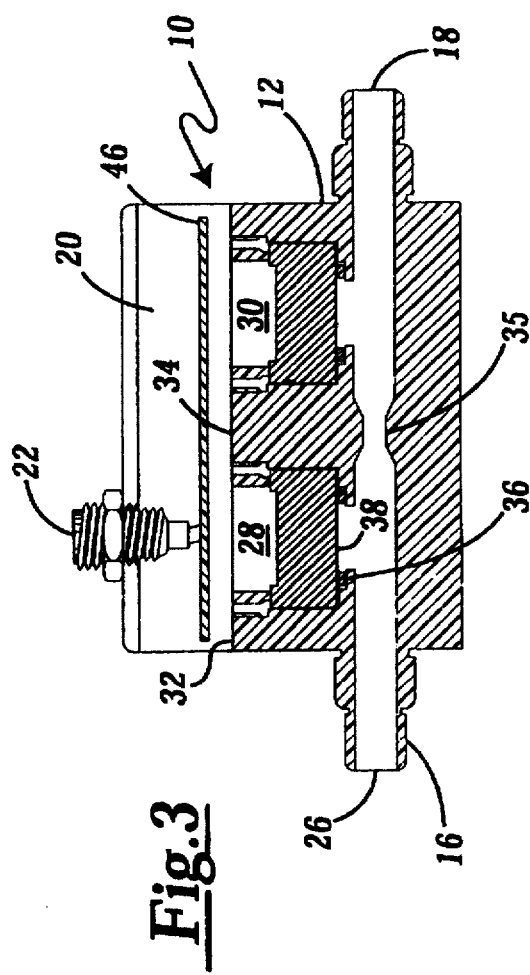
Fig.1
Fig.2
Fig.3

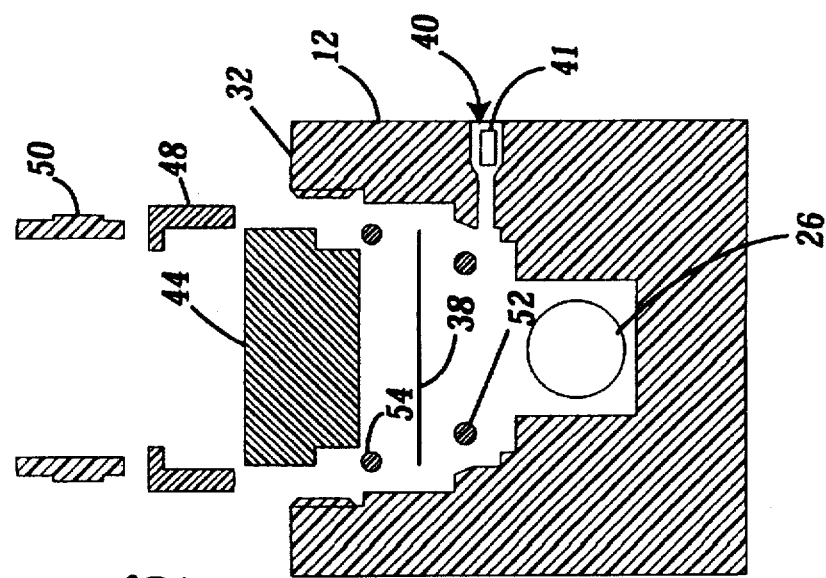
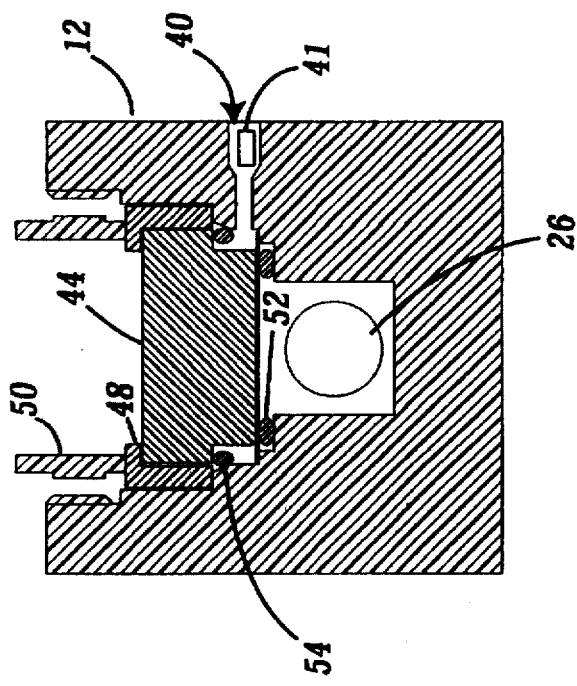

CHEMICALLY INERT FLOW METER WITHIN CAUSTIC FLUIDS HAVING NON-CONTAMINATING BODY

BACKGROUND OF THE INVENTION

1. Field of the Invention

This invention relates generally to flow meters, and more particularly, to a flow meter which may be connected in-line within a chemically corrosive fluid flow circuit in either a liquid or gaseous state, wherein the flow meter includes two chemically inert pressure sensors that are contained within a non-contaminating body on opposite sides of a constriction and may be isolated from the fluid flow circuit.

2. Discussion of the Related Art

Frequently, caustic fluids are used in the processing of sensitive materials. During the production of these sensitive materials, the susceptibility to contamination is a significant problem faced by manufacturers. The manufacturers may, for example, process semiconductor wafers using caustic fluids. Various manufacturing systems have been designed to reduce the contamination of the sensitive materials by foreign particles and generated vapors.

The processing equipment used in the manufacturing systems include designs that attempt to eliminate all sources of damaging contaminants. The processing of the sensitive materials often involves the direct contact of the sensitive materials with the caustic fluids. Hence, it is critical that the caustic fluids are delivered to the processing site in an uncontaminated state. Various components of the processing equipment are commonly designed to reduce the amount of particulate generated and to isolate the processing chemicals from contaminating influences.

Liquid transporting systems carry the caustic chemicals from supply tanks through pumping and regulating stations and through the processing equipment itself. The liquid chemical transport systems, which includes pipes, tubing, monitoring devices, sensing devices, valves, fittings and related devices, are frequently made of plastics resistant to the deteriorating effects of the toxic chemicals. Metals, which are conventionally used in such monitoring devices, cannot reliably stand up to the corrosive environment for long periods of time. Hence, the monitoring and sensing devices must incorporate substitute materials or remain isolated from the caustic fluids.

The processing equipment commonly used in semiconductor manufacturing has monitoring and sensing devices, such as pressure sensors and flow meters. These monitoring and sensing devices are connected in a closed loop feedback relationship and are used in monitoring and controlling the equipment. These monitoring and sensing devices must also be designed to eliminate any contamination which might be introduced. For example, a turbine flow meter known in the art has moving parts that wear out and become corrupted when exposed to the caustic fluids. Further, these turbine flow meters tend to trap fluid that contaminate subsequent process fluids. In avoiding the use of turbine flow meters, the monitoring and sensing devices may incorporate sensors. These devices must also be designed to avoid the introduction of particulate, unwanted ions, or vapors into the processing steps.

The general use of pressure sensors in flow meters is known in the art. For example a venturi, nozzle, orifice, or weir meter may be used for measuring or controlling the rate of flow. A differential sensor or pivot tube with sensors may be used, however, both these arrangements require small ports or capillaries that can easily plug or trap contaminants. The prior art does not disclose a flow meter which may be positioned in-line within a fluid flow circuit carrying corrosive materials, and which does not contaminate the processing fluids. Hence, a need exists for a flow meter having non-contaminating pressure sensors which may be positioned in-line within a fluid flow circuit carrying corrosive material. Also, a need exists for a flow meter, wherein the accuracy of the flow meter is not affected by thermal changes within the fluid flow circuit.

Mechanical processing equipment handling fluids are often subject to potential leakage and such leakage can create extremely hazardous conditions, both to the processing of the sensitive materials or other products and also to personnel who may have to tend and maintain the processing equipment. Hence, the chemical transport system must be designed such that leakage is avoided.

An in-line mechanical fluid pressure responsive gauge separated from the fluid flow by a protective membrane is known in the art. The gauge is contained within a housing having a cavity filled with a sensor fluid. The cavity is formed adjacent the fluid flow and separated by the protective but flexible membrane. The sensor fluid contained within the cavity is typically a silicone oil. A change in pressure within the fluid affects the silicone oil pressure within the cavity. The oil pressure is detected by the mechanical pressure responsive gauge.

The fluid within the cavity typically has large coefficient of thermal expansion, which may cause a significant deflection in the membrane. The large deflection changes in the protective membrane increases the likelihood that the fluid within the cavity will leak into the fluid flow, contaminating the flow circuit. Also, the accuracy of the pressure gauge is negatively affected by the large thermal expansions of the sensor fluid. Hence, a need exists for an in-line pressure gauge that does not leak contaminating fluids into the fluid flow circuit. Also, a need exists for a pressure gauge, wherein the accuracy is not affected by thermal changes within the fluid flow circuit.

Collins et al., in U.S. Pat. No. 5,316,035 (the '035 patent) describes the use of a capacitance proximity monitoring device in corrosive atmosphere environments. In one embodiment of the '035 patent, the capacitance proximity device is described as being incorporated into a functional apparatus, such as a piping system including valves and couplings. The capacitance proximity device serves as a functional portion of the apparatus and creates a sensing region within a predetermined area. It is then used to determine the change of electrical characteristics within the predetermined area as various fluids flow past the predetermined area. Monitoring changes in the current related to the sensing field when the liquid target media is present, versus air or gas in the piping when the liquid target media is absent, thereby produces an indication of the presence or absence of the target media. The complex valving is used to control fluid flow and the possibility exists that the fluid will leak and contaminate the processing fluid flow.

None of the above identified prior art discloses or even considers a device capable of determining the fluid flow rate within the caustic chemical transport system of chemical processing equipment. Further, none of the above identified prior art discloses a device that determines either or both the fluid flow rate and the pressure within the fluid flow. Monitoring the fluid flow within the chemical transport system is useful for several reasons. First, a change in flow within the system may be indicative of leakage within the system. Second, the flow within the transport system is regulated to avoid exceeding predetermined safety limits. Third, a change in fluid flow may indicate an obstruction or infiltration of contaminants into the fluid flow circuit.

Therefore, a need exists for a non-contaminating fluid flow meter which may be positioned in-line within a fluid flow circuit carrying corrosive materials, wherein the flow meter determines the rate of flow based upon a pressure differential measurement taken in the fluid flow circuit, wherein the determination of the rate of flow is not adversely affected by thermal changes within the fluid flow circuit. A need also exists for a flow meter that avoids the introduction of particulate, unwanted ions, or vapors into the flow circuit. The present invention addresses these needs.

SUMMARY OF THE INVENTION

The purpose of the present invention is to provide a flow meter that may be coupled in-line to a flow circuit transporting corrosive fluids, where the rate of flow may be determined from a differential pressure measurement taken within the flow circuit. The flow meter includes two pressure sensors contained within a non-contaminating body, wherein the pressure sensors are separated in the flow circuit by a constricting member.

The flow meter compensates for changes of temperature within fluid flow circuit and provides a zeroing feature which compensates for differences in pressure between the two sensors when the fluid is at rest. In the preferred embodiment, the components of the flow meter include a housing, a cover, an electrical connector, pressure fittings, isolation membranes, sealing rings, two pressure sensors, a circuit board and electronic circuitry, spacer rings and hold down rings.

The flow meter's housing has a bore extending therethrough, which forms a passage or conduit through which fluids flow, when the housing is connected in-line in a fluid flow circuit. Aligned and sealably connected to the opposed open ends of the bore are pressure fittings. The pressure fittings are constructed from a chemically inert material and are readily available and known to those skilled in the art.

The housing also has two pressure transducer receiving cavities extending from an external surface thereof, wherein each such cavity communicates independently with the bore. In the preferred embodiment, the bore tapers to a constricting region located between the two cavities. The restricted region results in a pressure drop within the bore across points adjacent the two cavities. This change in pressure may be detected by pressure sensor transducers placed within each of the two cavities. The rate of flow is determined from the change in pressure. The determination of the rate of flow using the two pressure sensors is discussed below.

An isolation membrane, pressure sensor, sealing members, spacer ring and hold down ring are contained within each cavity of the housing. These components and variations thereof are discussed in co-pending application Ser. No. 08/538,478, filed Oct. 3, 1995, and assigned to the same assigns as the present application, the entire disclosure of which is incorporated herein by reference.

A hybrid or fully integrated electronic circuit disposed in the housing is operatively coupled to both pressure sensor transducers and to an electrical connector contained in the cover. The electronic circuit develops a signal which is a measure of the rate of flow within the flow circuit from information sensed by both pressure sensors. Further, the electronic circuit may develop a signal corresponding to one or the other of the downstream or upstream static pressures within the fluid flow circuit, such that the orientation of the flow meter within the flow circuit is interchangeable and the direction of flow may be indicated by comparing the sensed pressure from each pressure sensor. When sensing the static pressures of gases flowing through the flow circuit, a correction may be made to the sensed pressures to correct for non-linearities as a result of gas density differences.

This electronic circuit may also be used in combination with temperature sensitive components to adjust the pressure measurement associated with each cavity based upon temperature changes within the flow circuit. Further, a switch may be incorporated into the electronic circuit that allows zeroing of the flow meter by the user.

The electronic circuit is coupled by electrical leads to the electrical connector and power may be transmitted to the electronic circuit through the electrical leads mating at the connector with an external power supply. Further, an analog output such as a standard 4–20 milliamps signal proportional to the calculated rate of flow may be transmitted through additional electrical leads.

In an alternate embodiment, the housing comprises two symmetric housing halves. Each housing half includes a longitudinal bore and counter bore for receiving a restriction member therein. In another embodiment, a portion of the longitudinal bore disposed between the two cavities has a third cavity which receives a removable insert. The insert has a channel extending therethrough, thereby forming a passage from one bore section to the other. In yet another alternate embodiment, a bushing is friction fit within the bore between the two cavities to thereby create the constriction. In a further alternate embodiment, inert sapphire pressure transducers are positioned within respective cavities and in direct contact with the fluid flow, thereby eliminating the isolation membrane.

OBJECTS

It is accordingly a principal object of the present invention to provide a non-contaminating flow meter adapted to be connected in-line in a fluid flow circuit.

Another object of the present invention is to provide a flow meter, wherein inert pressure sensor components of the flow meter may be situated in direct contact with the fluid flow.

Yet another object of the present invention is to provide a flow meter having isolation members that are in direct contact with the associated pressure sensors, the isolation members acting to isolate the sensors and associated electronic circuitry from potentially corrosive processing chemicals and precluding introduction of contaminating substances into the processing fluids being transported.

Still another object of the present invention is to provide a flow meter, wherein a pressure of the flow circuit is measured non-intrusively at two independent points within the flow circuit to thereby determine the rate of flow within the flow circuit.

A further object of the present invention is to provide a non-contaminating flow meter that compensates for initial pressure differences between the two pressure sensor transducers when the flow rate is zero.

Yet another object of the present invention is to provide a non-contaminating, chemically inert flow meter that determines either the rate of flow or pressure within the fluid flow circuit.

These and other objects, as well as these and other features and advantages of the present invention will become readily apparent to those skilled in the art from a review of the following detailed description of the preferred embodiment in conjunction with the accompanying drawings and claims and in which like numerals in the several views refer to corresponding parts.

DESCRIPTION OF THE DRAWINGS

FIG. 1 is a side elevational view of the flow meter made in accordance with the present invention;

FIG. 2 is a top plan view of the flow meter of the type shown in FIG. 1;

FIG. 3 is a partial sectional side elevational view of the flow meter of the type shown in FIG. 1;

FIG. 5 is an enlarged, partial sectional end elevational view of an alternate embodiment of the flow meter;

FIG. 6 is an exploded view of the flow meter shown in FIG. 5;

DETAILED DESCRIPTION OF THE PREFERRED EMBODIMENT

Figure 4:
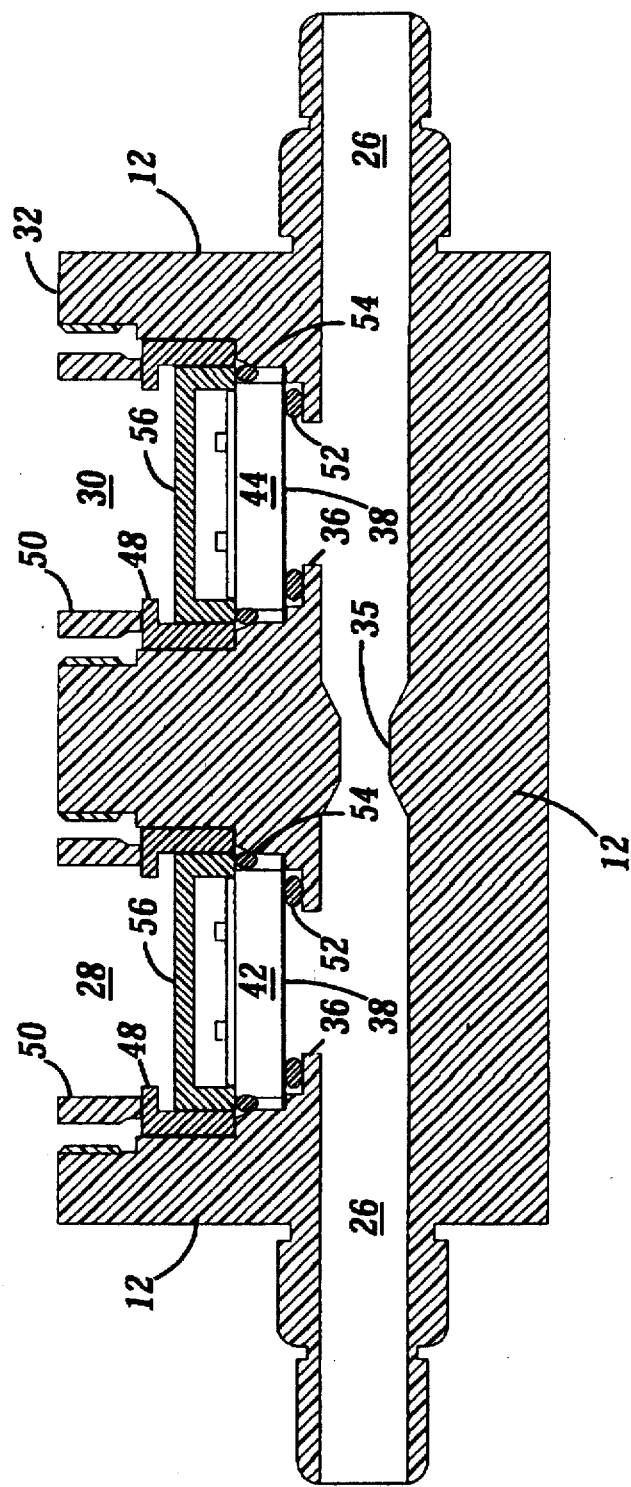
FIG. 4 is an enlarged, partial sectional side elevational view of an alternate embodiment of the flow meter with the cover and electric circuit removed.

Referring first to FIGS. 1 and 2, the flow meter is generally identified by numeral 10. The flow meter 10 generally includes a housing or body 12, mounting fastener slots 14, pressure inlet/outlet fittings 16 and 18, and a cover 20. An electrical connector 22, of known construction, may be removably attached in the cover 20. The housing 12 and cover 20 are preferably manufactured from a chemically-inert, non-contaminating polymer such as polytetrafluoroethylene (PTFE). The cover 20 has bores 24 extending through it for mounting the cover 20 to the housing 12 with appropriate screws (not shown). A suitable gasket (not shown) is preferably positioned between the cover and housing to allow the cover 20 to be sealed to the housing 12. Without any limitation intended, a gasket or seal manufactured from a multi-layer fabric, sold under the GOR-TEX® trademark by W. L. Gore & Assoc., Inc., allows venting of an internal area of the housing 12 for true atmospheric pressure reference, while restricting the flow of liquids into the internal area of the housing 12.

Referring to FIGS. 3–6, the internal construction of the flow meter 10 is shown. A longitudinal bore 26 extends through the housing 12 forming a conduit. Thus, when the flow meter 10 is connected in-line with a fluid flow circuit (not shown), via pressure fittings 16 and 18, the bore 26 serves as the fluid flow passage within the fluid flow circuit. The orientation of the flow meter 10, within the fluid flow circuit, may be reversed without affecting its effectiveness.

First and second transversely extending cavities 28 and 30 extend all the way from an outer surface 32 of the housing 12 to the bore 26. Those skilled in the art will appreciate that cavities 28 and 30 may each extend into the housing from a different sidewall of the housing. The two cavities 28 and 30 are separated a predetermined distance by dividing wall 34. The bore 26 also includes a constriction or restriction 35 located between the two cavities 28 and 30. Near the region within the housing where each cavities 28 and 30 and bore 26 intersect, an annular lip 36 is formed. Each lip 36 surrounds and further defines the opening to each cavity 28 and 30 from the bore 26.

A thin flexible polymer disk or isolation membrane 38 is positioned on the lip 36 of each cavity 28 and 30. Without limitation, the membrane is preferably constructed to have a thickness in a range between 0.001 and 0.040 inches. The upper surface of membrane 38 is abraded so as to create a pattern of grooves or channels. Preferably, the flexible membrane 38 is manufactured from tetrafluoroethylene fluorocarbon polymers. One such tetrafluoroethylene fluorocarbon polymer is sold under the TEFLON® trademark by E. I. dupont Nemours.

The isolation membranes 38 may have a thin film formed on its surface, to act as a buffer to any caustic chemicals leaking into the pressure transducer cavities. The thin film may further act as an electric shield for capacitance sensors, thereby obviating inaccuracy problems resulting from changes in dielectric properties as fluids flow through the flow meter. The thin film may for example be a carbon powder and epoxy ink painted onto the isolation membrane 38 or a thin film of carbon may be surface molded into the isolation membrane. The coated disk membrane 38 is preferably molded, since spraying or manufacturing by some other process may leave pinhole paths therein. Alternatively, the isolation membrane may be reinforced with carbon fibers, thereby increasing the elastic behavior of the isolation membrane 38, and reducing the cold flow tendencies of the PTFE isolation membrane.

When the flow meter 10 is fully assembled, the annular surface contact between each flexible membrane 38 and each cavity's lip 36 is such that a hermetic seal is formed therebetween. Various features of each lip 36 and isolation membrane 38, without any limitation intended, may be altered as described in the aforementioned co-pending application Ser. No. 08/538,478.

Each pressure transducer 42 and 44 is held in place within their respective cavities 28 and 30 by spacer ring 48 and externally threaded hold down ring 50. The isolation membranes 38 and transducers 42 and 44 are sealed within the housing 12 by chemically inert o-ring seals 52 and 54. A redundant seal is created by the positioning of o-rings 52 and 54. The seals 52 and 54 are readily available and of known construction to those skilled in the art. An additional spacer ring 56 (see FIG. 4) may be necessary, depending upon the dimensions of the pressure transducer.

A drain or conduit 40, shown in FIGS. 5 and 6, may be formed extending through the housing wall 32 into each cavity 28 and 30 between the redundant seals 52 and 54, thereby draining the area between the redundant seals. In this manner, the drain acts as a drainage, passageway or outlet, in the event that fluids leak past seal 52 from the fluid flow circuit. A sensor 41 is positioned within the drain 40 and is electrically connected (by leads not shown) to the electric circuit 46. Those skilled in the art will appreciate that a conductive sensor, capacitive sensor or non-electric fiber optic sensor may equally be used to sense the presence of fluids in the drain 40. When fluid leaks past the first seal, the fluid activates the sensor 41, thereby transmitting a signal to the electric circuit 46 which subsequently sets off an alarm.

The redundant sealing arrangement helps prevent exposure of the pressure transducers 42 and 44 and electric circuit 46 from the damaging affects of the caustic fluids. The redundant seal also further isolates the fluid flow, thereby reducing the potential contamination of the fluids. Additionally, a tube (not shown) may be connected to the drain 40, to thereby carry away the caustic fluids to a non-contaminating area.

Referring again to FIGS. 3 and 4, the pressure sensors 42 and 44 are positioned on top of the associated flexible isolation membrane 38. Each pressure sensor may be of a capacitance type or piezoelectric type known to those skilled in the art. The base of each pressure sensor is in direct contact with the membrane 38 and may be either in pressure contact with or bonded to the membrane by an adhesive, thermal welding or by other known means. The base may have a carbon film formed thereon, to act as an additional shield against potential leakage and further to act as electric shield.

In one embodiment, an alumina ceramic pressure sensor may be used, wherein the alumina ceramic pressure sensor comprises a thin, generally compliant ceramic sheet having an insulating spacer ring sandwiched between a thicker, non-compliant ceramic sheet. The first thin ceramic sheet or diaphragm is approximately 0.005 to 0.050 inches in thickness with a typical thickness of 0.020 inches. The thicker ceramic sheet has a thickness range between 0.100 to 0.200 inches. The spacer ring may be constructed of a suitable material such as a glass, polymer or alternatively the ceramic sheets may be brazed together. The opposed faces of ceramic disks are metalized by metals such as gold, nickel or chrome to create plates of a capacitor. A similar capacitive pressure transducer is described by Bell et al. in U.S. Pat. No. 4,177,496 (the '496 patent). Other capacitive pressure transducers similar to that described in the '496 patent are available and known in the art.

It is contemplated that the flexible membrane 38 could be eliminated if the pressure sensor used is of the sapphire capacitive pressure transducer type. A sapphire transducer is inert, and is resistant to wear when subjected to caustic fluids. Having a sapphire sensor in direct communication with the fluid flow, further enhances the pressure measurements of each transducer.

Figure 8:
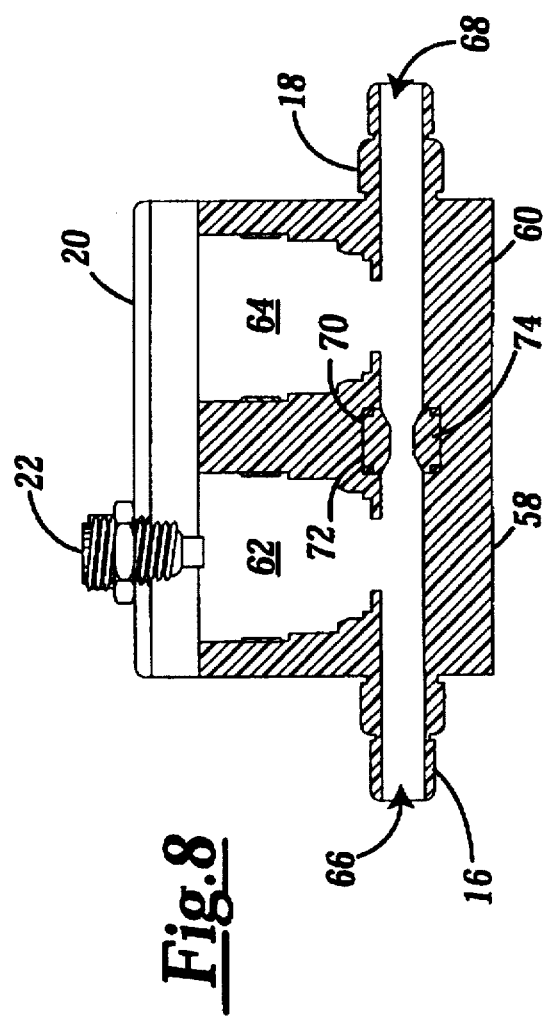
FIG. 8 is a partial sectional side elevational view the flow meter of the type shown in FIG. 7 with the pressure transducer, electronic circuit, isolation membrane hold down ring, spacer ring and seals removed for clarity.
Figure 7:
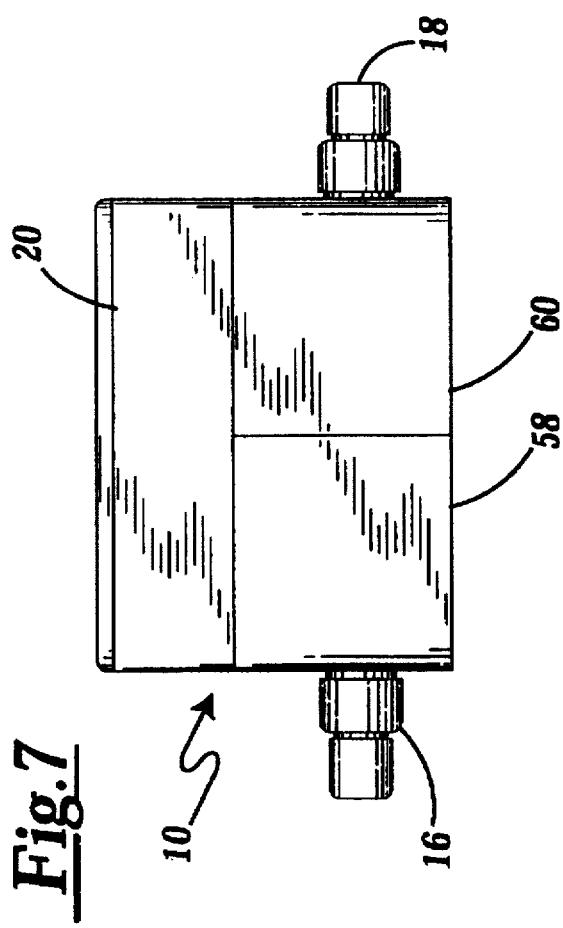
FIG. 7 is a side elevational view of an alternate embodiment of a flow meter in accordance with the present invention.
Figure 10:
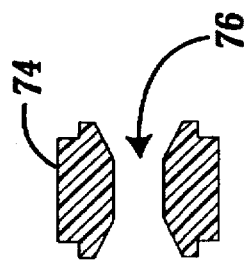
FIG. 10 is an enlarged sectional view of a restriction member used in the embodiment of FIG. 8.
Figure 9:
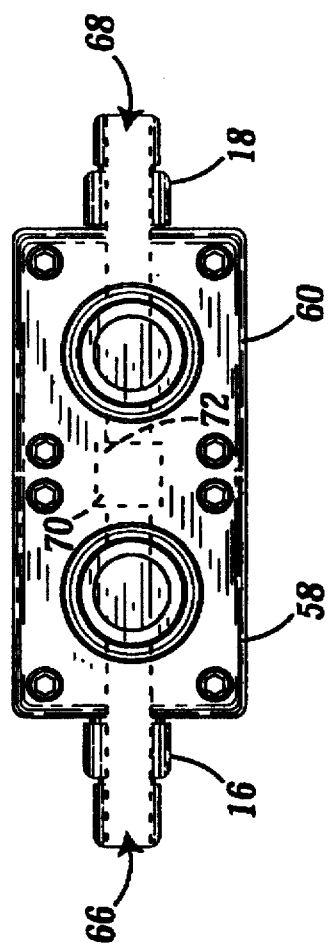
FIG. 9 is a top plan view of the flow meter of the type shown in FIG. 8, with the cover and electric circuit removed.

Referring next to FIGS. 7–9, an alternate embodiment of the flow meter's housing 12 is shown. The housing 12 is split into two sections or halves 58 and 60, wherein the downstream section 58 has a cavity 62 and longitudinal bore 66, and upstream section 60 has a cavity 64 and longitudinal bore 68 formed therein. The longitudinal bores 66 and 68 of each section 58 and 60 respectively, have respective counter bores 70 and 72. The two sections 58 and 60 are aligned and engaged, such that the counter bores 70 and 72 are aligned, thereby forming a hollow cavity in which a restriction member 74 is inserted (see FIGS. 8 and 9). The restriction member 74 has a central opening 76 extending therethrough (see FIG. 10), which is aligned with the longitudinal bores 66 and 68. The restrictions central opening 76 is smaller in diameter than either section's longitudinal bores 66 and 68. The restriction member 74 is sealably engaged with each housing section's bore 66 and 68 by chemically inert sealing o-rings known in the art. Without any limitation intended, the restriction member 74 and associated sealing rings are preferably constructed of polytetrafluoroethylene.

Figure 11:
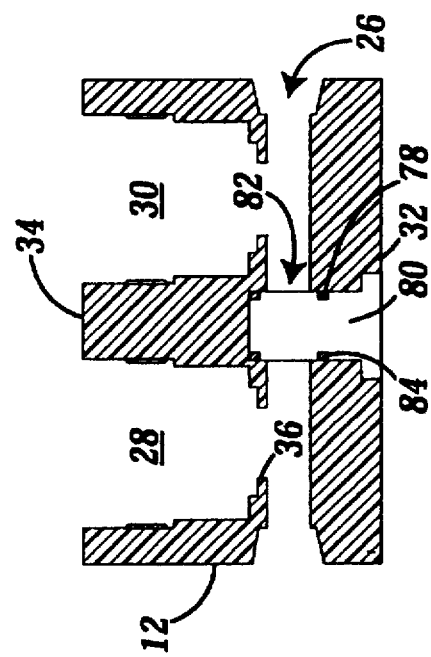
FIG. 11 is a partial sectional side elevational view of another embodiment of a flow meter housing in accordance with the present invention.

Referring now to FIG. 11, yet another alternate embodiment of the housing 12 is shown. In this embodiment, a third cavity 78 extends from a bottom outer surface of the housing 12 and into communication with the bore 26. The third cavity 78 is formed midway between the first and second cavities 28 and 30. A replaceable insert or plug 80 is inserted and sealed within the third cavity 78. The plug 80 has an opening or channel 82 (not shown) extending therethrough, wherein the channel 82 is aligned with the longitudinal bore 26, thereby forming a passage from one bore section to the other. It is contemplated that the third cavity 78 may extend from a top outer surface of the housing 12. In this arrangement, once the cover 20 is sealed to the housing 12, external access to the third cavity 78 would be limited.

The diameter of the channel 82 is less than the diameter of either bore section 26, thereby creating the constriction or restricted region. The plug 80 engages with the third cavity 78, by chemically inert o-rings 84 known in the art. Without any limitation intended, the plug 74 and sealing rings 84 are constructed of polytetrafluoroethylene, wherein the sealing rings 84 seal the plug 74 within the third cavity 78. The plug may alternatively be constructed of sapphire, a material resistant to wear from the fluid flow.

In another alternate embodiment the constriction 35 is formed by a bushing that is friction fit between the cavities 28 and 30. Of course, the bushing includes a bore of smaller cross-section than longitudinal bore 26, which interconnects the remaining bore sections. Those skilled in the art will appreciate that the constriction 35 may be created by a variety of forms including those discussed above. The constriction may be constructed of sapphire, thereby extending the longevity of the flow meter. Those skilled in the art will appreciate that sapphire is an inert substance, highly resistant to wear from caustic flowing fluids.

Those skilled in the art will appreciate that the cavities and housings of each embodiment are dimensioned to universally accept the same pressure fittings 16 and 18, cover 20, isolation membrane 38, pressure sensors 42 and 44, electronic circuit 46, spacer ring 48, and hold down ring 50. Also, each embodiment has a constricting area of varying construction between the sensor receiving cavities to create a pressure drop as the fluid flow traverses the restriction.

Referring again to FIG. 3, the electronic circuit module 46 is positioned above the ceramic pressure transducers 42 and 44 and is electrically coupled to the conductive surfaces of the ceramic pressure transducers 42 and 44. The electronic circuit module 46 is also connected by suitable leads (not shown) to internal contacts of the connector 22 (FIG. 1). In the preferred embodiment the electrical connector 22 is made of a chemically inert material and preferably may be of a type available from Pneumatico, part number po3rsd-00004-24.

Figure 12:
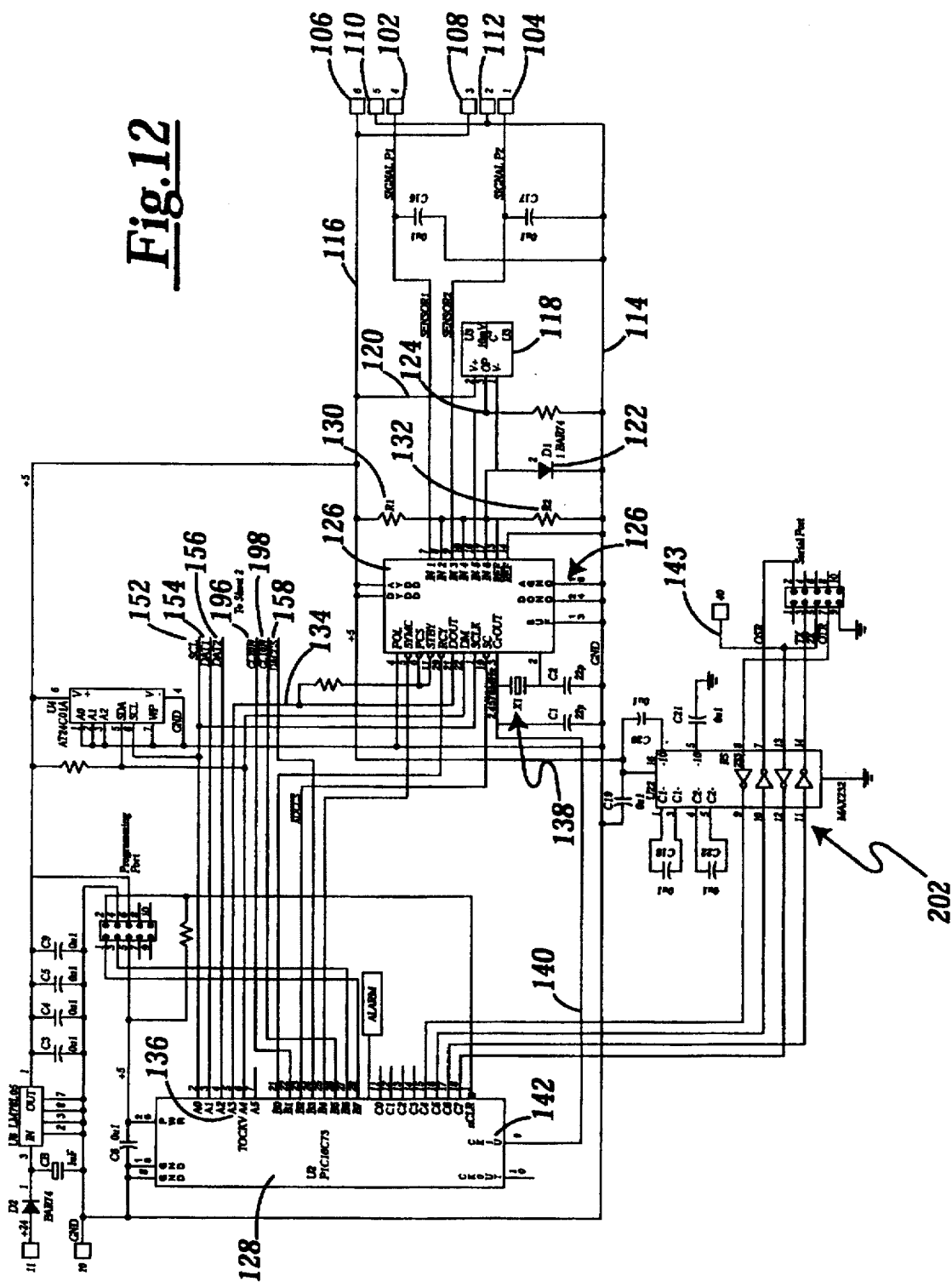
FIGS. 12 and 13 together is a schematic diagram of the electric circuit used in a flow meter in accordance with the present invention.
Figure 13:
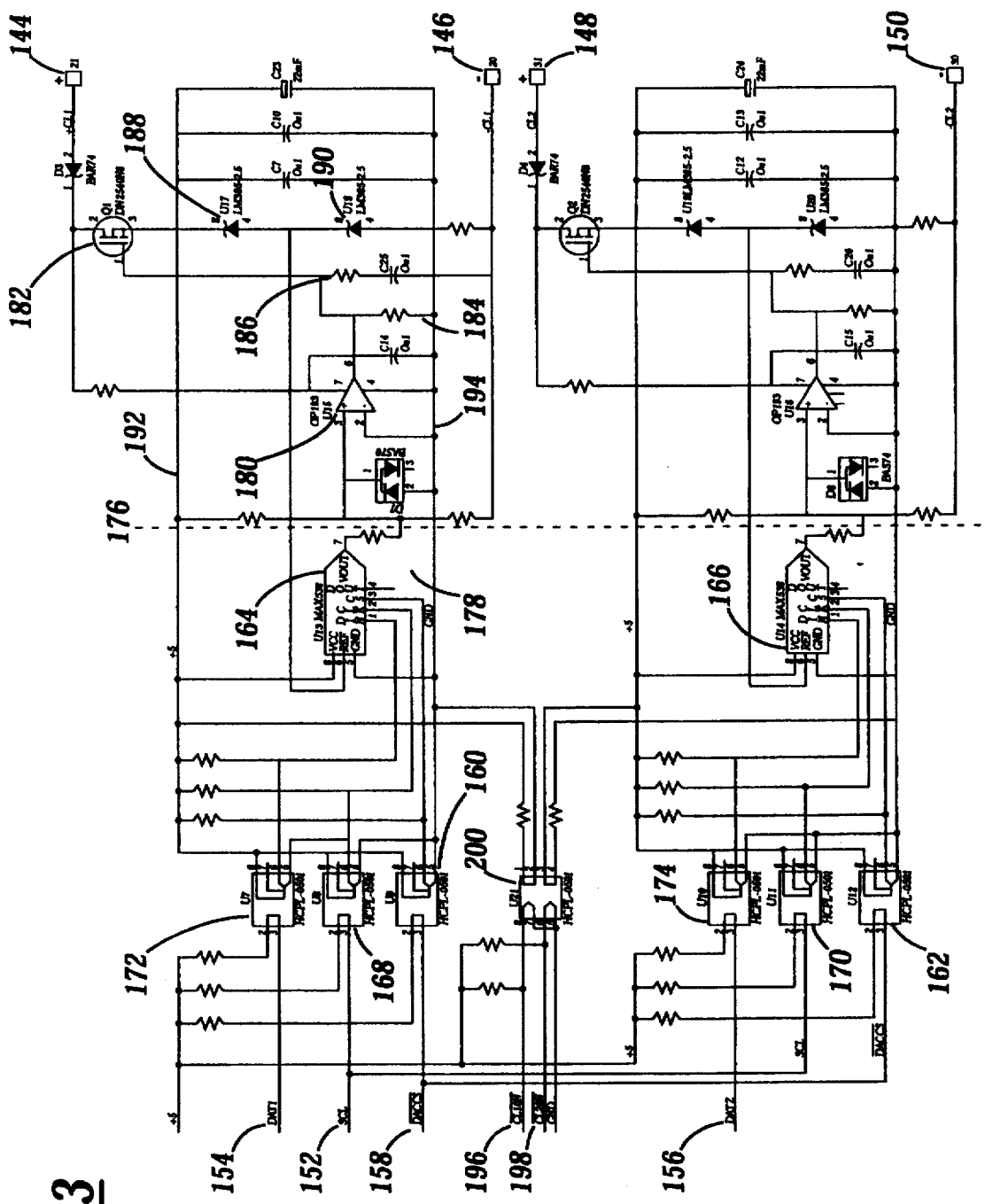

Referring to FIGS. 12 and 13, there is shown an electrical circuit schematic diagram of the electronic circuit module 46. The electronic circuit is used to convert the pressure readings from the two pressure transducers 42 and 44 to a 4–20 mA analog representation of flow or, alternatively, a pressure reading of the downstream pressure transducer 44. The raw analog signal from the upstream transducer 42 is supplied to input terminal 102 and, likewise, the raw analog transducer output signal from the downstream transducer 44 is supplied to the input terminal 104. Terminals 106 and 108 are power input terminals and terminals 110 and 112 are connected to the ground bus 114 (see FIG. 12).

Connected between the +5 volt power bus 116 and the ground bus 114 is an analog temperature compensation chip 118 which may preferably comprise a type LM 45 device available from National Semiconductor, Inc. The temperature compensation chip 118 has its $v^+$ terminal connected by conductor 120 to the +5v bus 116 and its $v^-$ input connected through a semiconductor diode 122 to the ground bus 114. The diode 122 provides an offset, so that the signal proportional to temperature produced on output terminal 124 of the temperature compensation chip 118 can go below 0° C., i.e., assuming a negative value.

The raw sensor signals produced on input terminals 102 and 104, together with the temperature compensation signal produced at terminal 124 are individually applied to a four channel sigma delta type analog to digital (A/D) converter chip 126. The chip 126 may preferably comprise an AD7714 integrated circuit chip supplied by Analog Devices Corporation. Those wishing details of the mode of operation of that integrated circuit are referred to the data sheets available from Analog Devices Corporation.

The sigma delta A/D converter 126 includes a digital filtering capability for the analog pressure inputs where the cut off frequency of the low pass filter is a programmable quantity set by the software executed in the microprocessor chip 128. Without limitation, the microprocessor 128 may comprise a type PIC 16C73 integrated circuit available from Microchip Technology Corporation. The resistive voltage divider including resistors 130 and 132, which are connected between the positive bus 116 and the ground bus 114, provide voltage compensation when the pressure data is being linearized.

The A/D chip 126 provides its serial output data stream on line 134 to a data input terminal 136 on the microprocessor 128. The serial data from the A/D converter chip 126 is clocked out, under control of timing signals provided by a crystal controlled clock circuit indicated generally by numeral 138. This clock circuit 138 also provides timing pulses over line 140 to the clock input terminal 142 of the microprocessor chip 128 for controlling its timing.

The microprocessor 128 is programmed to compute the instantaneous pressure differences being picked up by the upstream and downstream transducers 42 and 44 and to perform any necessary zeroing adjustments and scaling. A switch 143 is connected to the microprocessor 128. When switch 143 is switched to the on position, the difference in pressure between the two sensors 42 and 44 is calculated. This value is then stored. Typically, the user will activate switch 143 to test mode when there is no fluid flow. Any difference in pressure during no fluid flow will be stored in the microprocessor. The user then de-activates the switch 143. During fluid flow, the stored value is subtracted from the difference in pressures, thereby performing the zeroing adjustment. A test is also made to determine whether the thus scaled pressure difference is above or below preestablished high/low limits. If the pressure difference is above or below the pre-established high/low limits, an alarm is activated. When the pressure difference is within the preestablished limits, the rate of flow is computed.

It is known that, in steady-state flow, the flow rate is the same at any point. The flow rate (I) may be expressed as $I_m = \rho vA$. Where $\rho$ represents the density of the fluid, $v$ represents the velocity of the fluid, and A represents the area through which the fluid travels. Using the continuity equation $A_1 v_1 = A_2 v_2$, the rate of flow within the flow meter 10 may be found to be equal to a constant multiplied by the $\sqrt{P_1 - P_2}$. The microprocessor 128 thus computes the rate of flow from the data received from the two pressure sensors. Those skilled in the art will recognize that with laminar flow, the rate of flow approximates more closely a constant multiplied by $P_1 - P_2$. Hence, a low flow limit could be built into the system, such that if the "Reynolds number" is below a certain threshold, the flow meter identify the flow rate as zero.

FIG. 13 illustrates the circuitry used to convert the rate of flow computed by the microprocessor 128 into an analog signal falling in the range of from 4 mA to 20 mA for use by existing analog control systems. That is to say, the digital value of flow computed by the microprocessor 128 is converted to an analog signal whose current amplitude is directly proportional to the computed flow value and is in the range between 4 mA and 20 mA.

In addition to providing an analog current in the 4 mA to 20 mA range indicative of flow, the system may also be used to provide a 4 mA–20 mA current signal proportional to the pressure sensed by the downstream transducer 44 or upstream transducer 42. More particularly, as seen in FIG. 13, the circuitry is partitioned into substantially identical upper and lower channels where the 4 mA to 20 mA current signal proportional to flow becomes available across the output terminals 144 and 146, and the 4 mA–20 mA current signal proportional to pressure becomes available across the output terminals 148 and 150.

Referring back to FIG. 12, the microprocessor 128 provides a clocking signal on line 152 which connects to a corresponding line 152 in FIG. 13. Likewise, first and second data output lines 154 and 156, respectively, coming from the microprocessor 128 connect to the corresponding lines 154 and 156 at the left hand side of the schematic FIG. 13. Signals for determining which of the two channels in FIG. 13 is to be operative is also provided by way of a digital to analog converter chip select signal emanating from the microprocessor 128 on line 158. This signal is provided to an opto isolator circuit 160 and 162 whose output goes to the "chip select" terminal on either the digital-to-analog (D/A) converter chip 164 or the digital-to-analog chip 166. In each case, the D/A converters 164 and 166 may comprise a 12 bit device, such as a type MAX538 D/A converter chip available from Maxim Corporation.

As can be seen from FIG. 13, the clock signals on line 152, as well as the data signals on lines 154 and 156, are also optically isolated via opto couplers 168, 170, 172, and 174 with the resulting signals being applied to the respective D/A converters.

The circuitry to the right of the vertical-line 176 functions to convert the analog signal output, from either the digital to analog converter 164 or the digital to analog converter 166, to a current signal in the range of from 4 mA to 20 mA depending upon the amplitude of the voltage output from the D/A converters 164 and 166. As can be seen, the output from the D/A converter 164 is coupled through a resistor 178 to the non-inverting input of an operational amplifier 180. The inverting input thereof is connected to ground 194. The output of the operational amplifier 180 is connected to the gate electrode of a FET device 182 as are bias resistors 184 and 186.

A voltage reference for the FET device 182 and for the D/A converter 164 is obtained by means of series connected diodes 188 and 190 which are connected in series across the positive voltage bus 192 and the ground bus 194. In that the voltage to current converter circuitry associated with the D/A converter 166 illustrated to the right of the vertical line 176 is substantially identical to what has already been described in association with the D/A converter 164, it is deemed unnecessary to repeat that description.

The output lines 196 and 198 shown coming from the microprocessor 128 in FIG. 12, are applied via corresponding numbered lines in FIG. 13 to an opto coupler 200. The output from the opto coupler 200 indicates that power is present on lines 144 and 146 and also on lines 148 and 150.

Referring back to FIG. 12, the microprocessor chip 128 has associated with it a RS232 serial port indicated generally by numeral 202. As such, the flow meter device of the present invention is capable of communicating with a variety of peripheral devices including a further central processing unit (not shown). The electronic circuit 46 may also adjust the pressure and flow output as the temperature within the flow circuit changes by including a thermistor or like component therein. Each pressure transducer is corrected for temperature independently. One means of temperature compensation is disclosed in U.S. Pat. No. 4,598,381.

In use, the user couples the flow meter 10 into a fluid flow circuit through pressure fittings 16 and 18. As fluid flows through the flow circuit, the pressure adjacent each of the two cavities is detected by the electric circuit 46, whereby the rate of flow is calculated from the two detected pressures. The gauge pressure or absolute pressure may equally be used. From the determination of the flow rate, an alarm is activated if the flow rate or downstream pressure increases or decreases above or below predetermined limits, or the processing equipment is turned off.

Those skilled in the art will recognize that the flow rate may be calibrated so that minimum desired output values are associated with minimum pressure and maximum desired output pressures are associated with maximum pressure. For example, a pressure sensor intended to measure 0 to 100 psig (pounds per square inch gauge) can be calibrated to read 4 mA (milliamps) at 0 psig and 20 mA at 100 psig.

By providing the inert Teflon isolation membrane in intimate contact with the pressure sensors, the working fluid does not contact the surfaces of the sensor which could lead to contamination. The sealing arrangements disclosed, ensures that the working fluid does not enter the cavities of the housing 12 and adversely affect the electronic circuitry 46.

This invention has been described herein in considerable detail in order to comply with the patent statutes and to provide those skilled in the art with the information needed to apply the novel principles and to construct and use such specialized components as are required. However, it is to be understood that the invention can be carried out by specifically different devices, and that various modifications, both as to the equipment details and operating procedures, can be accomplished without departing from the scope of the invention itself.

What is claimed is:

1. A chemically inert fluid flow meter adapted to be connected in-line with a fluid flow circuit, comprising:
   (a) a chemically inert housing having a longitudinal bore of a first predetermined cross-sectional area extending through said housing forming a fluid flow conduit, wherein an inlet end and an outlet end of the conduit are adapted for connection, in-line, to the fluid flow circuit, said housing further having first and second spaced apart cavities each extending transversely from an external surface of said housing into the longitudinal bore of said housing, the longitudinal bore having a constriction disposed between said first and second cavities, the constriction having a second bore being of a second cross-sectional area that is less than the first predetermined cross-sectional area;
   (b) first means for sensing a first pressure within the flow circuit, said first means for sensing being contained within said first cavity;
   (c) second means for sensing a second pressure within the flow circuit, said second means for sensing being contained within said second cavity;
   (d) means for constraining the first and second means for sensing in a fixed position within the cavities of the housing; and
   (e) an electronic circuit contained within the housing and coupled to the first and second means for sensing, whereby the electronic circuit receives signals proportional to the sensed first and second pressures within the bore.

2. The fluid flow meter as recited in claim 1, wherein the electronic circuit further produces a signal proportional to a rate of fluid flow within the bore.

3. The fluid flow meter as recited in claim 2, wherein the electronic circuit further includes a means for adjusting the control signal to compensate for a pressure differential present when the rate of flow is zero.

4. The fluid flow meter as recited in claim 1, wherein the constriction of the longitudinal bore comprises a removable insert.

5. The fluid flow meter as recited in claim 4, wherein said removable insert is manufactured from sapphire.

6. The fluid flow meter as recited in claim 1, further comprising a chemically inert flexible membrane contained within each of said first and second cavities, proximate the longitudinal bore of said housing, each membrane having first and second opposed major surfaces, said first major surface being exposed to fluid flowing in the fluid flow conduit.

7. The fluid flow meter as recited in claim 1, wherein a drain extends transversely from the external surface of said housing into at least one of said first and second spaced apart cavities.

8. The fluid flow meter as recited in claim 7, wherein said drain further comprises a sensor positioned within said drain for sensing the presence of fluids within said drain.

9. The fluid flow meter as recited in claim 1, wherein the first and second means for sensing each comprise a sapphire sensor.

10. The fluid flow meter as recited in claim 1, wherein the electronic circuit includes a means for adjusting the control signal to compensate for fluctuations in temperature within the flow circuit.

11. A chemically inert fluid flow meter adapted to be connected in-line with a fluid flow circuit, comprising:
   (a) a chemically inert housing having a longitudinal bore of a first predetermined cross-sectional area extending through said housing forming a fluid flow conduit, wherein an inlet end and an outlet end of the conduit are adapted for connection, in-line, to the fluid flow circuit, said housing further having first and second spaced apart cavities each extending transversely from an external surface of said housing into the longitudinal bore of said housing, the longitudinal bore having a constriction disposed between said first and second cavities, the constriction having a second bore being of a second cross-sectional area that is less than the first predetermined cross-sectional area;

(b) first means for sensing a first pressure within the flow circuit, said first means for sensing being contained within said first cavity;

(c) second means for sensing a second pressure within the flow circuit, said second means for sensing being contained within said second cavity;

(d) means for constraining the first and second means for sensing in a fixed position within the cavities of the housing; and (e) an electronic circuit contained within the housing and coupled to the first and second means for sensing, whereby the electronic circuit receives signals proportional to the sensed first and second pressures within the bore and thereafter produces an electrical signal proportional to a rate of fluid flow within the bore determined from the sensed first and second pressures.

12. The fluid flow meter as recited in claim 11, wherein the constriction of the longitudinal bore comprises a removable insert.

13. The fluid flow meter as recited in claim 12, wherein said removable insert is manufactured from sapphire.

14. The fluid flow meter as recited in claim 11, wherein the housing comprises first and second housing halves each including a longitudinal bore and a counter bore for receiving a restriction member therein when the first and second housing halves are juxtaposed with the longitudinal bore of each housing half being aligned.

15. The fluid flow meter as recited in claim 11, wherein said means for constraining comprises two spacers and two hold down rings, wherein each hold down ring has threads formed on an external surface which mate with threads formed on an internal surface of each cavity, said spacers being positioned between said first and second means for sensing and said hold down rings, whereby when each hold down ring is screwed relative to the internal surface of each cavity, each hold down ring presses the associated spacer against the respective means for sensing.

16. The fluid flow meter as recited in claim 11, and further including a cover adapted to be attached to the housing in covering relation to the cavities, the cover including a chemically inert electrical connector electrically coupled to the electronic circuit.

17. The fluid flow meter as recited in claim 16, wherein a gasket is positioned in sealing relation between said cover and said housing.

18. The fluid flow meter as recited in claim 11, wherein the first and second means for sensing each comprise an alumina ceramic diaphragm sensor.

19. The fluid flow meter as recited in claim 11, wherein the first and second means for sensing each comprise a sapphire sensor.

20. The fluid flow meter as recited in claim 11, wherein the electronic circuit includes a means for adjusting the control signal to compensate for fluctuations in temperature within the flow circuit.

21. The fluid flow meter as recited in claim 11, wherein the electronic circuit further includes a means for adjusting the control signal to compensate for a pressure differential present when the rate of flow is zero.

22. The fluid flow meter as recited in claim 11, further comprising a chemically inert flexible membrane contained within each of said first and second cavities, proximate the longitudinal bore of said housing, each membrane having first and second opposed major surfaces, said first major surface being exposed to fluid flowing in the fluid flow conduit.

23. The fluid flow meter as recited in claim 11, wherein a conduit extends transversely from the external surface of said housing into at least one of said first and second spaced apart cavities.

24. The fluid flow meter as recited in claim 23, wherein said conduit further comprises a conductive sensor positioned within said conduit for sensing the presence of fluids within said conduit.

25. A chemically inert fluid flow meter adapted to be connected in-line with a fluid flow circuit, comprising:

(a) a chemically inert housing having a longitudinal bore of a first predetermined cross-sectional area extending through said housing forming a fluid flow conduit, wherein an inlet end and an outlet end of the conduit are adapted for connection to the fluid flow circuit, said housing further having first and second spaced apart cavities each extending transversely from an external surface of said housing into the longitudinal bore of said housing, the longitudinal bore having a constriction disposed between said first and second cavities, the constriction having a second bore being of a second cross-sectional area that is less than the first predetermined cross-sectional area;

(b) a chemically inert flexible membrane contained within each of said first and second cavities, proximate the longitudinal bore of said housing, thereby isolating an interior of said first and second cavities from fluid flowing in the fluid flow conduit, each membrane having first and second opposed major surfaces, said first major surface being exposed to fluid flowing in the fluid flow conduit;

(c) first means for sensing a first pressure within the flow circuit, said first means for sensing being contained within said first cavity;

(d) second means for sensing a second pressure within the flow circuit, said second means for sensing being contained within said second cavity;

(e) means for constraining the first and second means for sensing in a fixed position within the cavities of the housing; and (f) an electronic circuit contained within the housing and coupled to the first and second means for sensing, whereby the electronic circuit receives signals proportional to the sensed first and second pressures within the bore and thereafter produces an electrical signal proportional to a rate of fluid flow within the bore determined from the sensed first and second pressures.

26. The flow meter as recited in claim 25, wherein the first cavity further comprises a first seal member positioned to sealably engage said flexible membrane to said housing and a second seal member aligned to sealably engage said first means for sensing to said housing, wherein said housing further has a drain channel extending from the first cavity of said housing to the outer surface of said housing between said first and second seal members.

27. The flow meter as recited in claim 25, wherein the second cavity further comprises a first seal member positioned to sealably engage said flexible membrane to said housing and a second seal member aligned to sealably engage said second means for sensing to said housing, wherein said housing further has a drain channel extending from the second cavity of said housing to the outer surface of said housing between said first and second seal members.

28. The fluid flow meter as recited in claim 25, wherein said means for constraining comprises two spacers and two hold down rings, wherein each hold down ring has threads formed on an external surface which mate with threads formed on an internal surface of each first and second cavity, said spacers being positioned between said first and second means for sensing and said hold down rings, whereby when each hold down ring is screwed relative to the internal surface of each cavity, each hold down ring presses the associated spacer against the respective means for sensing.

29. The pressure transducer module as recited in claim 25, wherein said housing further has a vent extending from the outer surface of said housing into each cavity of said housing.

* * * * *

EX PARTE REEXAMINATION CERTIFICATE (5246th)
United States Patent
Cucci et al.

(10) Number: US 5,672,832 C1
(45) Certificate Issued: Dec. 20, 2005

(54) CHEMICALLY INERT FLOW METER WITHIN CAUSTIC FLUIDS HAVING NON-CONTAMINATING BODY

(75) Inventors: Gerald R. Cucci, Minneapolis, MN (US); Diane L. England, Minneapolis, MN (US)

(73) Assignee: NT International, Inc., Minneapolis, MN (US)

Reexamination Request:
No. 90/006,180, Jan. 8, 2002

Reexamination Certificate for:
Patent No.: 5,672,832
Issued: Sep. 30, 1997
Appl. No.: 08/601,786
Filed: Feb. 15, 1996

(51) Int. Cl.⁷ ............... G01F 1/37; G01F 1/44; G01L 7/00
(52) U.S. Cl. ............... 73/861.52; 73/861.47; 73/706

(56) References Cited

U.S. PATENT DOCUMENTS

| | | | |
|---|---|---|---|
| 2,190,713 A | 2/1940 | Hintze et al. | 123/169 |
| 2,734,526 A | 2/1956 | Aagaard | 137/486 |
| 2,734,527 A | 2/1956 | Aagaard | 137/486 |
| 3,645,139 A | 2/1972 | Zavoda | 73/406 |
| 3,930,823 A | 1/1976 | Kurtz et al. | 65/33 |
| 4,010,769 A | 3/1977 | De Lorenzo et al. | 137/312 |
| 4,177,496 A | 12/1979 | Bell et al. | 361/283 |
| 4,192,192 A | 3/1980 | Schnell | 73/715 |
| 4,252,510 A | 2/1981 | Bromley | 417/534 |
| 4,322,980 A | 4/1982 | Suzuki et al. | 73/727 |
| 4,343,456 A | 8/1982 | Zitzloff | 251/255 |
| 4,461,181 A | 7/1984 | North | 73/749 |
| 4,507,973 A | 4/1985 | Barr et al. | 73/724 |
| 4,653,330 A | 3/1987 | Hedtke | 73/756 |
| 4,994,781 A | 2/1991 | Sahagen | 338/47 |
| 5,063,784 A | 11/1991 | Ridenour | 73/756 |
| 5,088,329 A * | 2/1992 | Sahagen | 73/727 |
| 5,137,026 A * | 8/1992 | Waterson et al. | 600/538 |
| 5,167,158 A | 12/1992 | Kamachi et al. | 73/706 X |
| 5,183,078 A | 2/1993 | Sorrell | 137/883 |
| 5,184,514 A * | 2/1993 | Cucci et al. | 73/706 |
| 5,284,425 A | 2/1994 | Holtermann et al. | 417/395 |
| 5,287,851 A * | 2/1994 | Beran et al. | 128/204.23 |
| 5,316,035 A | 5/1994 | Collins et al. | 137/312 |
| 5,347,862 A | 9/1994 | Ingman | 73/269 |
| 5,357,792 A | 10/1994 | Getenby | 73/119 A |
| 5,410,916 A | 5/1995 | Cook | 73/706 |

(Continued)

FOREIGN PATENT DOCUMENTS

| | | |
|---|---|---|
| JP | 6-129927 | 5/1994 |
| JP | 07072029 | 3/1995 |
| JP | 08313379 | 5/1995 |
| JP | 2552093 | 11/1996 |

OTHER PUBLICATIONS

Fluoroware, Integra Pneumatically Operated Diaphragm Valves, 1993 and 1994.*

(Continued)

*Primary Examiner*—Edward Lefkowitz

(57) ABSTRACT

A non-contaminating flow meter having an isolation member is disclosed. The flow meter includes two pressure sensor transducers, located on opposite sides of a restriction in a conduit. Each of pressure transducers is isolated by an isolation member from exposure to fluids flowing through the conduit. The flow meter may be positioned in-line within a fluid flow circuit carrying corrosive materials, wherein the square root of the difference in pressure between the two pressure sensors is calculated to thereby determine the rate of flow within the fluid flow conduit. The flow meter compensates for changes in temperature within the fluid flow circuit and further activates an alarm if the pressure or flow rate within the fluid flow conduit exceeds or falls below a threshold level. The flow meter of the present invention also avoids the introduction of particulate, unwanted ions, or vapors into the flow circuit.

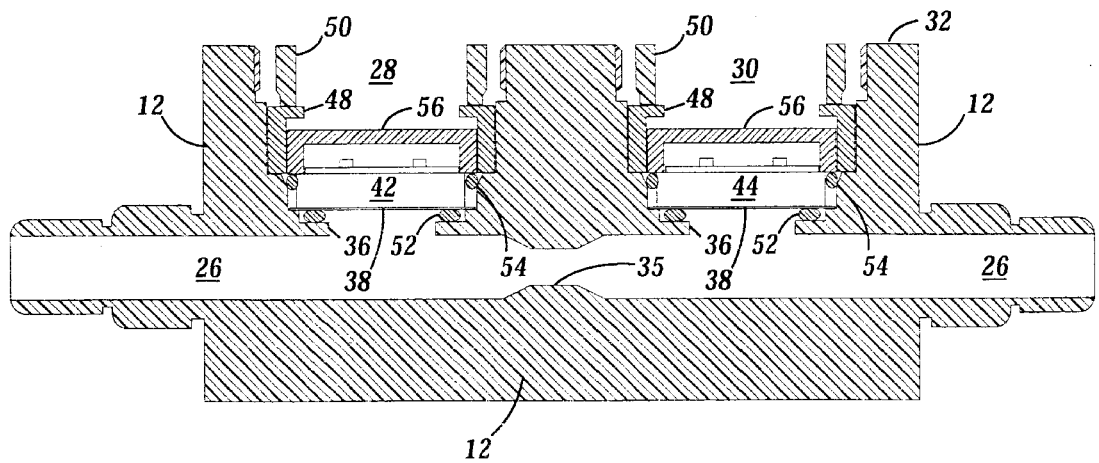

U.S. PATENT DOCUMENTS

| | | |
|---|---|---|
| 5,563,347 A | 10/1996 | Martin et al. ................. 73/756 |
| 5,604,315 A | 2/1997 | Briefer et al. ............ 73/718 X |
| 5,653,191 A | 8/1997 | Calhoun et al. ............ 116/272 |
| 5,654,512 A | 8/1997 | Harnett et al. ........... 73/861.53 |
| 5,656,780 A | 8/1997 | Park ............................ 73/724 |
| 5,657,001 A | 8/1997 | Wilson ....................... 340/611 |
| 5,668,322 A | 9/1997 | Broden ........................ 73/756 |
| 5,693,887 A | 12/1997 | Englund et al. .............. 73/723 |
| 5,822,173 A | 10/1998 | Dague et al. ............ 361/283.3 |
| 5,878,000 A | 3/1999 | Dubois ....................... 367/188 |

OTHER PUBLICATIONS

Mace Products Catalog, Model 968 Leak Detection System, 1991.*

The Daniel Series 1200 Flow Computers, Daniel Orifice Fitting Company, 1965.

Integra Pneumatically Operated Diaphragm Valves, 1993 and 1994.

Furon Product Catalog, ChemAlert Weir–Style Diaphragm Valve, 1994.

New Pathfinder Flowmeters by Futurestar, 1986.

Fischer & Porter Product Catalog, Teflon Lined Through–Flow Rotameters, 1983.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 12 is cancelled.

Claims 1, 4, 6, 9, 11, 13, 14, 15, 16, 18, 19, 22, 23, 24, 25, 26, 27, 28 and 29 are determined to be patentable as amended.

Claims 2–3, 5, 7–8, 10, 17, 20 and 21, dependent on an amended claim, are determined to be patentable.

New claims 30–61 and 62 are added and determined to be patentable.

1. A chemically inert fluid flow meter adapted to be connected in-line with a *corrosive chemical* fluid flow circuit, comprising;
   (a) a chemically inert housing *formed from a chemically inert, non-contaminating polymer that is resistant to corrosive processing chemicals, the housing* having a longitudinal bore of a first predetermined cross-sectional area extending through said housing forming a fluid flow conduit, wherein an inlet end and an outlet end of the conduit are adapted for connection, in-line, to the *corrosive chemical* fluid flow circuit, said housing further having first and second spaced apart cavities each extending transversely from an external surface of said housing into the longitudinal bore of said housing, the longitudinal bore having a constriction disposed between said first and second cavities, the constriction having a second bore being of a second cross-sectional area that is less than the first predetermined cross-sectional area;
   (b) first means for sensing a first pressure within the *corrosive chemical fluid* flow circuit, said first means for sensing being contained within said first cavity;
   (c) second means for sensing a second pressure within the *corrosive chemical fluid* flow circuit, said second means for sensing being contained within said second cavity;
   (d) means for constraining the first and second means for sensing in a fixed position within the cavities of the housing; and
   (e) an electronic circuit contained within the housing and coupled to the first and second means for sensing, whereby the electronic circuit receives signals proportional to the sensed first and second pressures within the bore,
   *wherein the first and second means for sensing are each comprised of a sensor selected from the group consisting of a sapphire sensor and an alumina ceramic diaphragm sensor.*

4. The fluid flow meter as recited in claim 1, wherein the constriction of the longitudinal bore comprises a *chemically inert* removable insert.

6. The fluid flow meter as recited in claim 1, further comprising a chemically inert, *non-contaminating* flexible membrane contained within each of said first and second cavities, proximate the longitudinal bore of said housing, each membrane having first and second opposed major surfaces, said first major surface being exposed to fluid flowing in the fluid flow conduit.

9. The fluid flow meter as recited in claim 1, wherein the first and second means for sensing each comprise a sapphire sensor *adapted to be in directed communication with the fluid flow, wherein only a sapphire portion of the sapphire sensor is exposed to the corrosive chemicals.*

11. A chemically inert fluid flow meter adapted to be connected in-line with a *corrosive chemical* fluid flow circuit, comprising:
   (a) a chemically inert housing *formed from a chemically inert, non-contaminating polymer that is resistant to corrosive processing chemicals, the housing* having a longitudinal bore of a first predetermined cross-sectional area extending through said housing forming a fluid flow conduit, wherein an inlet end and an outlet end of the conduit are adapted for connection, in-line, to the *corrosive chemical* fluid flow circuit, said housing further having first and second spaced apart cavities each extending transversely from an external surface of said housing into the longitudinal bore of said housing, the longitudinal bore having a constriction disposed between said first and second cavities, the constriction having a second bore being of a second cross-sectional area that is less than the first predetermined cross-sectional area;
   (b) first means for sensing a first pressure within the flow circuit, said first means for sensing being contained within said first cavity *and being chemically inert and non-contaminating to the fluid flow when in contact with the fluid flow*;
   (c) second means for sensing a second pressure within the flow circuit, said second means for sensing being contained within said second cavity *and being contained within said second cavity and being chemically inert and non-contaminating to the fluid flow when in contact with the fluid flow*;
   (d) means for constraining the first and second means for sensing in a fixed position within the cavities of the housing; and
   (e) an electronic circuit contained within the housing and coupled to the first and second means for sensing, whereby the electronic circuit receives signals proportional to the sensed first and second pressures within the bore and thereafter produces an electrical signal proportional to a rate of fluid flow within the bore determined from the sensed first and second pressures,
   *wherein the constriction of the longitudinal bore comprises a chemically inert removable insert.*

13. The fluid flow meter as recited in claim [12] *11*, wherein said removable insert is manufactured from sapphire.

14. The fluid flow meter as recited in claim 11, wherein the *non-contaminating polymer* housing comprises first and second housing halves each including a longitudinal bore and a counter bore for receiving a *chemically inert* restriction member therein when the first and second housing halves are juxtaposed with the longitudinal bore of each housing half being aligned.

15. The fluid flow meter as recited in claim 11, wherein said means for constraining comprises two spacers and two hold down rings, [wherein each hold down ring has threads formed on an external surface which mate with threads formed on an internal surface of each cavity,] said spacers being positioned between said first and second means for sensing and said hold down rings, whereby [when each hold down ring is screwed relative to the internal surface of each cavity,] each hold down ring presses the associated spacer against the respective means for sensing.

16. The fluid flow meter as recited in claim 11, and further including a *chemically inert, non-contaminating polymer* cover adapted to be attached to the housing in covering relation to the cavities, the cover incuding a chemically inert electrical connector electrically coupled to the electronic circuit.

18. The fluid flow meter as recited in claim 11, wherein the first and second means for sensing each [comprise] *comprised of a sensor selected from the group consisting of a sapphire sensor and* an alumina ceramic diaphragm sensor.

19. The fluid flow meter as recited in claim 11, wherein the first and second means for sensing each comprise a sapphire sensor *adapted to be in directed communication with the fluid flow, wherein only a sapphire portion of the sapphire sensor is exposed to the corrosive chemicals.*

22. The fluid flow meter as recited in claim 11, further comprising a chemically inert *non-contaminating* flexible membrane contained within each of said first and second cavities, proximate the longitudinal bore of said housing, each membrane having first and second opposed major surfaces, said first major surface being exposed to fluid flowing in the fluid flow conduit.

23. The fluid flow meter as recited in claim 11, wherein a [conduit] *drain* extends transversely from the external surface of said housing into at least one of said first and second spaced apart cavities.

24. The fluid flow meter as recited in claim 23, wherein said [conduit] *drain* further comprises a conductive sensor positioned within said [conduit] *drain* for sensing the presence of fluids within said [conduit] *drain*.

25. A chemically inert fluid flow meter adapted to be connected in-line with a *corrosive chemical* fluid flow circuit, comprising:

(a) a chemically inert housing *formed from a chemically inert, non-contaminating polymer that is resistant to corrosive processing chemicals, the housing* having a longitudinal bore of a first predetermined cross-sectional area extending through said housing forming a fluid flow conduit, wherein an inlet end and an outlet end of the conduit are adapted for connection to the *corrosive chemical* fluid flow circuit, said housing further having first and second spaced apart cavities each extending transversely from an external surface of said housing into the longitudinal bore of said housing, the longitudinal bore having a constriction disposed between said first and second cavities, the constriction having a second bore being of a second cross-sectional area that is less than the first predetermined cross-sectional area;

(b) a *removable,* chemically inert flexible membrane *formed from a chemically inert, non-contaminating polymer, the membrane* contained within each of said first and second cavities, proximate the longitudinal bore of said housing, thereby isolating an interior of said first and second cavities from *corrosive chemical* fluid flowing in the fluid flow conduit, each membrane having first and second opposed major surfaces, said first major surface being exposed to fluid flowing in the fluid flow conduit;

(c) first means for sensing a first pressure within the *corrosive chemical fluid* flow circuit, said first means for sensing being contained within said first cavity *and disposed adjacent the second major surface of the membrane*;

(d) second means for sensing a second pressure within the *corrosive chemical fluid* flow circuit, said second means for sensing being contained within said second cavity *and disposed adjacent the second major surface of the membrane*;

(e) means for constraining the first and second means for sensing in a fixed position within the cavities of the housing; and (f) an electronic circuit contained within the housing and coupled to the first and second means for sensing, whereby the electronic circuit receives signals proportional to the sensed first and second pressures within the bore and thereafter produces an electrical signal proportional to a rate of fluid flow within the bore determined from the sensed first and second pressures.

26. [The flow meter as recited in claim 25, wherein] *A chemically inert fluid flow meter adapted to be connected in-line with a corrosive chemical fluid flow circuit, comprising;*

*(a) a chemically inert housing formed from a chemically insert, non-contaminating polymer that is resistant to corrosive processing chemicals, the housing having a longitudinal bore of a first predetermined cross-sectional area extending through said housing forming a fluid flow conduit, wherein an inlet end and an outlet end of the conduit are adapted for connection to the corrosive chemical fluid flow circuit, said housing further having first and second spaced apart cavities each extending transversely from an external surface of said housing into the longitudinal bore of said housing, the longitudinal bore having a constriction disposed between said first and second cavities, the constriction having a second bore being of a second cross-sectional area that is less than the first predetermined cross-sectional area;*

*(b) a removable chemically inert flexible membrane formed from a chemically inert, non-contaminating polymer, the membrane contained within each of said first and second cavities, proximate the longitudinal bore of said housing, thereby isolating an interior of said first and second cavities from corrosive chemical fluid flowing in the fluid flow conduit, each membrane having first and second opposed major surfaces, said first major surface being exposed to fluid flowing in the fluid flow conduit;*

*(c) first means for sensing a first pressure within the corrosive chemical fluid flow circuit, said first means for sensing being contained within said first cavity and disposed adjacent the second major surface of the membrane;*

*(d) second means for sensing a second pressure within the corrosive chemical fluid flow circuit, said second means for sensing being contained within said second cavity and disposed adjacent the second major surface of the membrane;*

*(e) means for constraining the first and second means for sensing in a fixed position within the cavities of the housing;*

(f) the first cavity further [comprises a] *comprising a chemically inert* first seal member positioned to sealably engage said flexible membrane to said housing and a *chemically inert* second seal member aligned to sealably engage said first means for sensing to said housing, [wherein said] *the* housing further [has] *having* a drain channel extending from the first cavity of said housing to the outer surface of said housing between said first and second seal members; *and*

(g) *an electronic circuit contained within the housing and coupled to the first and second means for sensing, whereby the electrical circuit receives signals proportional to the sensed first and second pressures within the bore and thereafter produces an electrical signal proportional to a rate of fluid flow within the bore determined from the sensed first and second pressures.*

27. The flow meter as recited in claim 25, wherein the second cavity further comprises a *chemically inert* first seal member positioned to sealably engage said flexible membrane to said housing and a *chemically inert* second seal member aligned to sealably engage said second means for sensing to said housing, wherein said housing further has a drain channel extending from the second cavity of said housing to the outer surface of said housing between said first and second seal members.

28. The fluid flow meter as recited in claim 25, wherein said means for constraining comprises two spacers and two hold down rings, [wherein each hold down ring has threads formed on an external surface which mate with threads formed on an internal surface of each first and second cavity,] said spacers being positioned between said first and second means for sensing and said hold down rings, whereby [when each hold down ring is screwed relative to the internal surface of each cavity,] each hold down ring presses the associated spacer against the respective means for sensing.

29. The [pressure transducer module] *fluid flow meter* as recited in claim 25, wherein said housing further has a vent extending from the outer surface of said housing into each cavity of said housing.

*30. The chemically inert fluid flow meter of claim 25, wherein the chemically inert, non-contaminating polymer is comprised of a fluoropolymer.*

*31. The chemically inert fluid flow meter of claim 25, wherein the chemically inert, non-containing polymer is comprised of a polytetrafluoroethylene (PTFE) polymer.*

*32. The chemically inert fluid flow meter of claim 25, wherein the chemically inert, non-contaminating polymer membrane is comprised of a tetrafluoroethylene fluorocarbon polymer.*

*33. The chemically inert fluid flow meter of claim 1, wherein the chemically inert, non-contaminating polymer is comprised of a fluoropolymer.*

*34. The chemically inert fluid flow meter of claim 1, wherein the chemically inert, non-contaminating polymer is comprised of a polytetrafluoroethylene (PTFE) polymer.*

*35. The fluid flow meter of claim 6, wherein the chemically inert, flexible membrane is selected from the group consisting of a chemically inert, non-contaminating polymer, a fluoropolymer and a tetrafluoroethylene fluorocarbon polymer.*

*36. The fluid flow meter of claim 1, wherein the first and second sensing means further comprise a removable chemically inert, non-contaminating component that is in contact with each of said first and second sensing means and is adapted to be exposed to the fluid flowing in the fluid flow conduit.*

*37. A chemically inert fluid flow meter adapted to be connected in line with a corrosive chemical flue flow circuit, comprising:*

(a) *a chemically inert housing formed from a chemically inert, non-contaminating polymer that is resistant to corrosive processing chemicals, the housing having a longitudinal bore of a first predetermined cross-sectional area extending through said housing forming a fluid flow conduit wherein an inlet end and an outlet end of the conduit are adapted for connection in-line, to the corrosive chemical fluid flow circuit, said housing further having first and second spaced apart cavities, wherein a drain extends transversely from the external surface of said housing into at least one of said first and second spaced apart cavities, each spaced apart cavity extending transversely from an external surface of said housing into the longitudinal bore of said housing, the longitudinal bore having a constriction disposed between said first and second cavities, the constriction having a second bore being of a second cross-sectional area that is less than the first predetermined cross-sectional area;*

(b) *first means for sensing a first pressure within the corrosive chemical fluid flow circuit, said first means for sensing being contained within said first cavity;*

(c) *second means for sensing a second pressure within the corrosive chemical fluid flow circuit, said second means for sensing being contained within said second cavity;*

(d) *means for constraining the first and second means for sensing in a fixed position within the cavities of the housing;*

(e) *the first cavity further comprising a chemically inert first seal member positioned to sealably engage said flexible membrane to said housing and a chemically inert second seal member aligned to sealably engage said first means for sensing to said housing, the housing further having a drain channel extending from the first cavity of said housing to the outer surface of said housing between said first and second seal members;*

(f) *an electronic circuit contained within the housing and coupled to the first and second means for sensing, whereby the electronic circuit receives signals proportional to the sensed first and second pressures within the bore, wherein the first and second means for sensing are each comprised of a sensor selected from the group consisting of a sapphire sensor and an alumina ceramic diaphragm sensor.*

*38. A chemically inert fluid flow meter adapted to be connected in line with a corrosive chemical fluid flow circuit comprising:*

(a) *a chemically inert housing formed from a chemically inert, non-contaminating polymer that is resistant to corrosive processing chemicals, the housing having a longitudinal bore of a first predetermined cross-sectional area extending through said housing forming a fluid flow conduit, wherein an inlet end and an outlet end of the conduit are adapted for connection, in-line, to the corrosive chemical fluid flow circuit, said housing further having first and second spaced apart cavities, wherein a drain extends transversely from the external surface of said hosing into at least one of said second apart cavities, each spaced apart cavity extending transversely from an external surface of said housing into the longitudinal bore of said housing, the longitudinal bore having a constriction disposed between said first and second cavities, the constriction having a second bore being of a second cross-sectional area that is less than the first predetermined cross-sectional area;*

(b) first means for sensing a first pressure within the flow circuit, said first means for sensing being contained within said first cavity and being chemically inert and non-contaminating to the fluid flow when in contact with the fluid flow;

(c) second means for sensing a second pressure within the flow circuit, said second means for sensing being contained within said second cavity and being chemically inert and non-contaminating to the fluid flow when in contact with the fluid flow;

(d) means for constraining the first and second means for sensing in a fixed position within the cavities of the housing;

(e) the first cavity further comprising a chemically inert first seal member positioned to sealably engage said flexible membrane to said housing and a chemically inert second seal member aligned to sealably engage said first means for sensing to said housing, wherein the conduit extends from the first cavity of said housing to the outer surface of said housing between said first and second seal members; and (f) an electronic circuit contained within the housing and coupled to the first and second means for sensing, whereby the electronic circuit receives signals proportional to the sensed first and second pressures within the bore and thereafter produces an electrical signal proportional to a rate of fluid flow within the bore determined from the sensed first and second pressures, wherein the constriction of the longitudinal bore comprises a chemically inert removable insert.

39. The flow meter as recited in claim 1, wherein at least one of the first and second cavities further comprises a chemically inert first seal member positioned to sealably engage at lest one of said sensing means to said housing.

40. The flow meter as recited in claim 39, wherein the at least one of the first and second cavities further comprises a chemically inert second seal member aligned to sealably engage at least one of said sensing means to said housing, wherein the second seal member is adjacent the first seal member thereby forming a redundant seal arrangement.

41. A chemically inert fluid flow meter adapted to be connected in-line with a corrosive chemical fluid flow circuit, comprising:

(a) a chemically inert housing formed from a chemically inert non-contaminating polymer that is resistant to corrosive processing chemicals, the housing having a longitudinal bore of a first predetermined cross-sectional area extending through said housing forming a fluid flow conduit, wherein an inlet end and an outlet end of the conduit are adapted for connection, in-line, to the corrosive chemical fluid flow circuit, said housing further having first and second spaced apart cavities each extending transversely from an external surface of said housing into the longitudinal bore of said housing, the longitudinal bore having a constriction disposed between said first and second cavities, the constriction having a second bore being of a second cross-sectional area that is less than the first predetermined cross-sectional area that is less than the first predetermined cross-sectional area;

(b) first means for sensing a first pressure within the corrosive chemical fluid flow circuit, said first means for sensing being contained within said first cavity;

(c) second means for sensing a second pressure within the corrosive chemical fluid flow circuit, said second means for sensing being contained with said second cavity;

(d) means for constraining the first and second means for sensing in a fixed positioned within the cavities of the housing;

(e) at least one of the first and second cavities further comprising a chemically inert first seal member positioned to sealably engage at least one of said sensing means to said housing, wherein the at least one of the first and second cavities further comprises a chemically inert second seal member aligned to sealably engage at least one of said sensing means to said housing, wherein the second seal member is adjacent the first seal member thereby forming a redundant seal arrangement;

(f) a drain channel extending from the first cavity of said housing to the outer surface of said housing between said first and second chemically inert seal members; and (g) an electronic circuit contained within the housing and coupled to the first and second means for sensing, whereby the electronic circuit receives signals proportional to the sensed first and second pressures within the bore, wherein the first and second means for sensing are each comprised of a sensor selected from the group consisting of a sapphire sensor and an alumina ceramic diaphragm sensor.

42. A chemically inert fluid flow circuit of a chemically corrosive semiconductor processing plant comprising;

a chemically corrosive fluid; and a flow meter adapted to be connected in-line within a corrosive chemical fluid flow circuit the flow meter comprising;

(a) a chemically inert housing formed from a chemically inert, non-contaminating polymer that is resistant to corrosive processing chemicals of the semiconductor processing plant, the housing having a longitudinal bore of a first predetermined cross-sectional area extending through said housing forming a fluid flow conduit for corrosive chemicals, wherein an inlet end and an outlet end of the conduit are adapted for in-line connection to the corrosive chemical fluid flow circuit, said housing further having first and second spaced apart cavities each extending transversely from an external surface of said housing into the longitudinal bore of said housing the longitudinal bore having a constriction disposed between said first and second cavities, the constriction having a second bore being of a cross-sectional area that is less than the first predetermined cross-sectional area;

(b) first means for sensing a first pressure within the flow circuit, said first means for sensing being contained within said first cavity and adapted to be resistant and non-contaminating to the corrosive processing chemicals;

(c) second means for sensing a second pressure within the flow circuit, said second means for sensing being contained within said second cavity and adapted to be resistant and non-contaminating to the corrosive processing chemicals;

(d) means for constraining the first and second means for sensing in a fixed position within the cavities of the housing; and (e) an electronic circuit contained within the housing and coupled to the first and second means for sensing, whereby the electronic circuit receives signals proportional to the sensed first and second pressures within the bore.

43. The chemically inert fluid flow circuit of claim 40, wherein the chemically inert, non-contaminating polymer is comprised of a fluoropolymer.

44. The chemically inert fluid flow circuit of claim 40, wherein the chemically inert, non-contaminating polymer is comprised of a polytetrafluoroethylene (PTFE) polymer.

45. The fluid flow circuit of claim 40, wherein the first and second means for sensing each comprise a sapphire sensor adapted to be in direct communication with the fluid flow, wherein only a sapphire portion of the sapphire sensor is exposed to the corrosive chemicals.

46. The fluid flow circuit of claim 40, further comprising a chemically inert, non-contaminating polymer cover adapted to be attached to the housing in covering relation to the cavities, the cover including a chemically inert electrical connector electrically coupled to the electronic circuit.

47. The fluid flow meter as recited in claim 1, and further including a chemically inert, non-contaminating polymer cover adapted to be attached to the housing in covering relation to the cavities the cover including a chemically insert electrical connector electrically coupled to the electronic circuit.

48. The fluid flow meter as recited in claim 15, wherein each hold down ring has threads formed on an external surface which mate with threads formed on a internal surface of each cavity and when each hold down ring is screwed relative to the internal surface of each cavity.

49. The fluid flow meter as recited in claim 28, wherein each hold down ring has threads formed on an external surface which mate with threads formed on an internal surface of each first and second cavity and when each hold down ring is screwed relative to the internal surface of each cavity.

50. The fluid flow meter of claim 1, wherein the electronic circuit is adapted to provide a pressure measurement output of the fluid within the conduit independent of a flow rate within the conduit.

51. The fluid flow meter of claim 50, wherein the pressure measurement includes a signal output proportional to the pressure sensed by at least one of the first and second pressure sensing means.

52. The fluid flow meter of claim 8, wherein the sensor is selected from the group consisting of a conductive sensor, a capacitive sensor and a non-electric fiber optic sensor.

53. The fluid flow meter of claim 1, wherein the housing includes a third cavity that extends from a bottom outer surface of the housing and into communication with the bore.

54. The fluid flow meter of claim 51, wherein a third cavity is adapted to be sealed with a chemically inert, non-contaminating replaceable insert.

55. The fluid flow meter of claim 54, wherein the replacement insert is comprised of a polytetrafluoroethylene (PTFE) polymer.

56. A chemically inert fluid flow meter adapted to be connected in-line with a corrosive chemical fluid flow circuit, comprising:

(a) a chemically inert housing formed from a chemically inert, non-contaminating polymer that is resistant to corrosive processing chemicals the housing having a longitudinal bore of a first predetermined cross-sectional area extending through said housing forming a fluid flow conduit, wherein an inlet end and an outlet end of the conduit are adapted for connection, in-line, to the corrosive chemical fluid flow circuit, said housing further having first and second spaced apart cavities each extending transversely from an external surface of said housing into the longitudinal bore of said housing, the longitudinal bore having a constriction disposed between said first and second cavities the constriction having a second bore being of a second cross-sectional area that is less than the first predetermined cross-sectional area;

(b) first means for sensing a first pressure within the corrosive chemical fluid flow circuit, said first means for sensing being contained within said first cavity;

(c) second means for sensing a second pressure within the corrosive chemical fluid flow circuit, said second means for sensing being contained within said second cavity;

(d) means for constraining the first and second means for sensing in a fixed position within the cavities of the housing; and (e) an electronic circuit contained within the housing and coupled to the first and second means for sensing whereby the electronic circuit receives signals proportional to the sensed first and second pressures within the bore, wherein the electronic circuit further produces a signal proportional to a rate of fluid flow within the bore, wherein the electronic circuit further includes a means for adjusting the control signal to compensate for a pressure differential present when the rate of flow is zero, said means for adjusting the control signal being adapted to calculate a differential pressure for a predefined number of readings and then average the predefined number of readings, and is further adapted to store an average value in memory and compare a present value with a future average value when performing a flow calculation.

57. A chemically inert fluid flow meter adapted to be connected in-line with a corrosive chemical fluid flow circuit comprising:

(a) a chemically inert housing formed from a chemically inert, non-contaminating polymer that is resistant to corrosive processing chemicals, the housing having a longtidunal bore of a first predetermined cross-sectional area extending through said housing forming a fluid flow conduit, wherein an inlet end and an outlet end of the conduit are adapted for connection, in-line, to the corrosive chemical fluid flow circuit, said housing further having first and second spaced apart cavities each extending transversely from an external surface of said housing into the longitudinal bore of said housing, the longitudinal bore having a constriction disposed between said first and second cavities, the constriction having a second bore being of a second cross-sectional area that is less than the first predetermined cross-sectional area;

(b) first means for sensing a first pressure within the corrosive chemical fluid flow circuit, said first means for sensing being contained within said first cavity;

(c) second means for sensing a second pressure within the corrosive chemical fluid flow circuit, said second means for sensing being contained within said second cavity;

(d) means for constraining the first and second means for sensing in a fixed position within the cavities of the housing;

(e) an isolation membrane contained within each of the first and second cavities and adapted to isolate the first and second sensing means from the fluid flow wherein the isolation membrane includes a first surface and a second surface, the second surface disposed adjacent the fluid while the first surface is adjacent at least one of the first and second sensing means, the first surface having thereon a thin film adapted to be an electric shield to each of the first and second sensing means; and (f) an electronic circuit contained within the housing and coupled to the first and second means for sensing, whereby the electronic circuit receives signals proportional to the sensed and second pressures within the bore.

58. The fluid flow meter as recited in claim 57, wherein the thin film is comprised of a material selected from the group consisting of a carbon powder/epoxy ink paint and a carbon film surface molded to the isolation membrane.

59. A chemically inert fluid flow meter adapter to be connected in-line with a corrosive chemical fluid flow circuit, comprising:

(a) a chemically inert housing formed from a chemically inert, non-contaminating polymer that is resistant to corrosive processing chemicals, the housing having a longitudinal bore of a first predetermined cross-sectional area extending through said housing forming a fluid flow conduit, wherein an inlet end and an outlet end of the conduit are adapted for connection, in-line, to the corrosive chemical fluid flow circuit, said housing further having first and second spaced apart cavities each extending transversely from an external surface of said housing into the longitudinal bore of said housing, the longitudinal bore having a constriction disposed between said first and second cavities, the constriction having a second bore being of a second cross-sectional area that is less than the first predetermined cross-sectional area;

(b) first means for sensing a first pressure within the corrosive chemical fluid flow circuit, said first means for sensing being contained within said cavity;

(c) second means for sensing a second pressure within the corrosive chemical fluid flow circuit, said second means for sensing being contained with said second cavity;

(d) means for constraining the first and second means for sensing in a fixed position within the cavities of the housing;

(e) an isolation membrane contained within each of the first and second cavities and adapted to isolate the first and second sensing means from the fluid flow, wherein a surface of the sensing means adjacent the isolation membrane includes thereon a thin film adapted to be an electronic shield to the sensing means; and (f) an electronic circuit contained within the housing and coupled to the first and second means for sensing, whereby the electronic circuit receives signals proportional to the sensed first second pressures within the bore.

60. The fluid flow meter as recited in claim 1, wherein the electronic circuit is adapted to provide a gas flow measurement output of gases flowing through the flow circuit.

61. The fluid flow meter are recited in claim 60, wherein the electronic circuit is adapted to correct the sensed pressures so as to correct for non-linearities as a result of gas density differences.

62. The fluid meter as recited in claim 2, wherein the electronic circuit further includes a switch that allows zeroing of the flow meter by a user.

* * * * *